United States Patent
Kovalan et al.

(10) Patent No.: US 9,611,033 B1
(45) Date of Patent: Apr. 4, 2017

(54) SYSTEM AND METHOD FOR MAINTAINING SYSTEM INTEGRITY IN CONTROL SYSTEMS HAVING MULTI-LANE COMPUTATIONAL DIFFERENCES

(71) Applicants: Mark A. Kovalan, Cedar Rapids, IA (US); Mark Clifford Singer, Cedar Rapids, IA (US); Douglas R. Johnson, Cedar Rapids, IA (US)

(72) Inventors: Mark A. Kovalan, Cedar Rapids, IA (US); Mark Clifford Singer, Cedar Rapids, IA (US); Douglas R. Johnson, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 14/864,846

(22) Filed: Sep. 24, 2015

(51) Int. Cl.
*B64C 19/00* (2006.01)
*G05B 19/05* (2006.01)

(52) U.S. Cl.
CPC .............. *B64C 19/00* (2013.01); *G05B 19/05* (2013.01)

(58) Field of Classification Search
CPC ..................................................... B64C 19/00
See application file for complete search history.

(56) References Cited

U.S. PATENT DOCUMENTS

| 8,538,602 B2 * | 9/2013 | Brot ...................... G05D 1/0077 244/221 |
| 9,139,289 B2 * | 9/2015 | Raynaud .................. G05B 9/03 |
| 9,194,300 B2 * | 11/2015 | Sebaa ........................ F02C 6/08 |
| 2011/0276199 A1 * | 11/2011 | Brot ...................... G05D 1/0077 701/3 |

* cited by examiner

*Primary Examiner* — Thomas Tarcza
*Assistant Examiner* — Michael Berns
(74) *Attorney, Agent, or Firm* — Nolte & Associates PC

(57) ABSTRACT

A control system for an aircraft including first and second lanes having respective first and second processors dissimilar to one another and configured to output respective first and second computation data. At least one programmable logic device may be configured to receive the first computation data output and the second computation data output, determine a difference therebetween, and transmit a corrective computation data output to the first processor and the second processor via respective feedback loops if the difference between the first computation data output and the second computation data output exceeds a predetermined threshold value.

19 Claims, 2 Drawing Sheets

SYSTEM AND METHOD FOR MAINTAINING SYSTEM INTEGRITY IN CONTROL SYSTEMS HAVING MULTI-LANE COMPUTATIONAL DIFFERENCES

BACKGROUND

High-integrity processing platforms, e.g., flight deck or auto flight platforms, typically employ cross-comparing of computation outputs from two or more processors in order to detect and/or mitigate random faults. For applications such as fly-by-wire, two or more commercial-off-the-shelf (COTS) processors are generally used to compute fault-independent outputs which may be cross-compared to detect potential common-mode errors and random faults. The cross-comparison may be carried out using a bit-for-bit comparison method, or the cross-comparison may be carried out using a threshold comparison method that may allow for small differences in the computation outputs within certain predefined tolerance values.

In view of the expressed preferences of several certification agencies (e.g., Federal Aviation Administration, Transport Canada, European Aviation Safety Agency) to use dissimilar COTS processors and/or algorithms to address the occurrence of random faults as well as arbitrary generic (design) faults, certain drawbacks have become apparent in each of the aforementioned cross-comparison methods. In fly-by-wire applications utilizing dissimilar COTS processors, it may not be guaranteed that bit-for-bit identical results will be obtained from computations, due to round-off errors and/or design choices in the implementations of the COTS processors, despite the processors being designed to follow conventional mathematical standards, such as, for example, IEEE floating point specification. Detailed processors design data that might be used to analytically identify potential differences and/or confirm identical results is generally not available, due to the design data being proprietary to the developers of the processors and/or the supporting software.

Moreover, in fly-by-wire applications utilizing dissimilar COTS processors, a conventional method for avoiding divergence in threshold comparison applications may allow for common-mode errors and random faults to go undetected. Conventionally, a transfer or exchange of data between processors, either in a master/follower or cross-exchange/agreement mechanism, has been used to prevent divergence. Although data is exchanged between fault-independent lanes, this method has been generally permitted by certification agencies, as an accepted bounded behavior has been implicitly assumed or analytically predictable when a lane fault occurs. However, based at least on potential arbitrary design errors or undetectable random faults within either of the dissimilar COTS processors resulting from design choices in the implementations thereof, it has been theorized that data exchanged between lanes may be utilized in a manner that defeats lane independence and fault detection. For example, in an instance in which a design/implementation of one of the COTS processors results in a fault, this consistent exposure of an improper output to the other processor(s) may result in a system failure (e.g., hard-over or misleading data) when combined with any common hardware fault of the other lane.

What is needed, then, is a system and method for maintaining system integrity in flight control systems including redundant computation lanes having dissimilar processors providing minor computational differences, while maintaining fault independence of the redundant computation lanes for safety and certification purposes.

SUMMARY

In one aspect, embodiments of the inventive concepts disclosed herein are directed to a control system for an aircraft. The control system may include a first lane configured to communicate with one or more sensors. The one or more sensors may be configured to generate event data utilized in controlling the aircraft. The first lane may include a first processor configured to receive input data including the event data from the one or more sensors and to generate a first computation data output in electronic communication with one or more actuators or instrumentation utilized in operation of the aircraft. The control system may also include a second lane configured to communicate with the one or more sensors. The second lane may include a second processor configured to receive the input data including the event data from the one or more sensors and to generate a second computation data output. The control system may further include a comparator in electronic communication with the first processor and the second processor. The comparator may be configured to receive the first computation data output and the second computation data output and to transmit a command signal operable to prohibit the electronic communication between the first processor and the one or more actuators or instrumentation if a first difference between the first computation data output and the second computation data output exceeds a first predetermined threshold value. The control system may also include at least one programmable logic device in electronic communication with the first processor and the second processor. The at least one programmable logic device may be configured to receive the first computation data output and the second computation data output, determine a second difference between the first computation data output and the second computation data output, and transmit a corrective computation data output to the first processor and the second processor via respective feedback loops if the difference between the first computation data output and the second computation data output exceeds a second predetermined threshold value.

In a further aspect, embodiments of the inventive concepts disclosed herein are directed to a monitoring method for a control system of an aircraft. The monitoring method may include transmitting event data generated from one or more sensors indicative of operation characteristics of the aircraft to a first processor of a first computation lane and a second processor of a second computation lane. The monitoring method may also include processing input data including the event data in the first processor and generating a first computation data output in electronic communication with one or more actuators or instrumentation utilized in operation of the aircraft. The monitoring method may further include processing the input data including the event data in the second processor and generating a second computation data output. The monitoring method may also include transmitting a command signal operable to prohibit the electronic communication between the first processor and the one or more actuators or instrumentation if a first difference between the first computation data output and the second computation data output exceeds a first predetermined threshold value. The monitoring method may further include determining a second difference between the first computation data output and the second computation data output in at least one programmable logic device, and calculating a corrective computation data output if the second difference exceeds a second predetermined threshold value stored in the at least one programmable logic device. The monitoring method may also include feeding the corrective computation data output to the first processor and the second processor via respective feedback loops if the second difference exceeds the second predetermined threshold value.

In a further aspect, embodiments of the inventive concepts disclosed herein are directed to an aircraft control system including a plurality of redundant channels. Each channel may include a command lane configured to electronically communicate with one or more sensors. The one or more sensors may be configured to generate event data for use in controlling the aircraft. The first lane may include a first processor configured to receive input data including the event data from the one or more sensors indicative of operation characteristics of the aircraft. The first processor may be further configured to generate a first computation data output in electronic communication with one or more actuators or instrumentation utilized in operation of the aircraft. Each channel may also include a monitor lane configured to electronically communicate with the one or more sensors. The monitor lane may include a second processor configured to receive the input data including the event data from the one or more sensors. The second processor may be further configured to generate a second computation data output. Each channel may further include at least one programmable logic device in electronic communication with the first processor and the second processor. The at least one programmable logic device may be configured to receive the first computation data output and the second computation data output, determine a difference between the first computation data output and the second computation data output, compare the difference to a predetermined threshold value, calculate a corrective computation data output if the difference exceeds the predetermined threshold value, and output the corrective computation data output to the first processor and the second processor via respective feedback loops. The corrective computation data output may be limited in magnitude by a second predetermined threshold value.

BRIEF DESCRIPTION OF THE DRAWINGS

Embodiments of the inventive concepts disclosed herein are best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
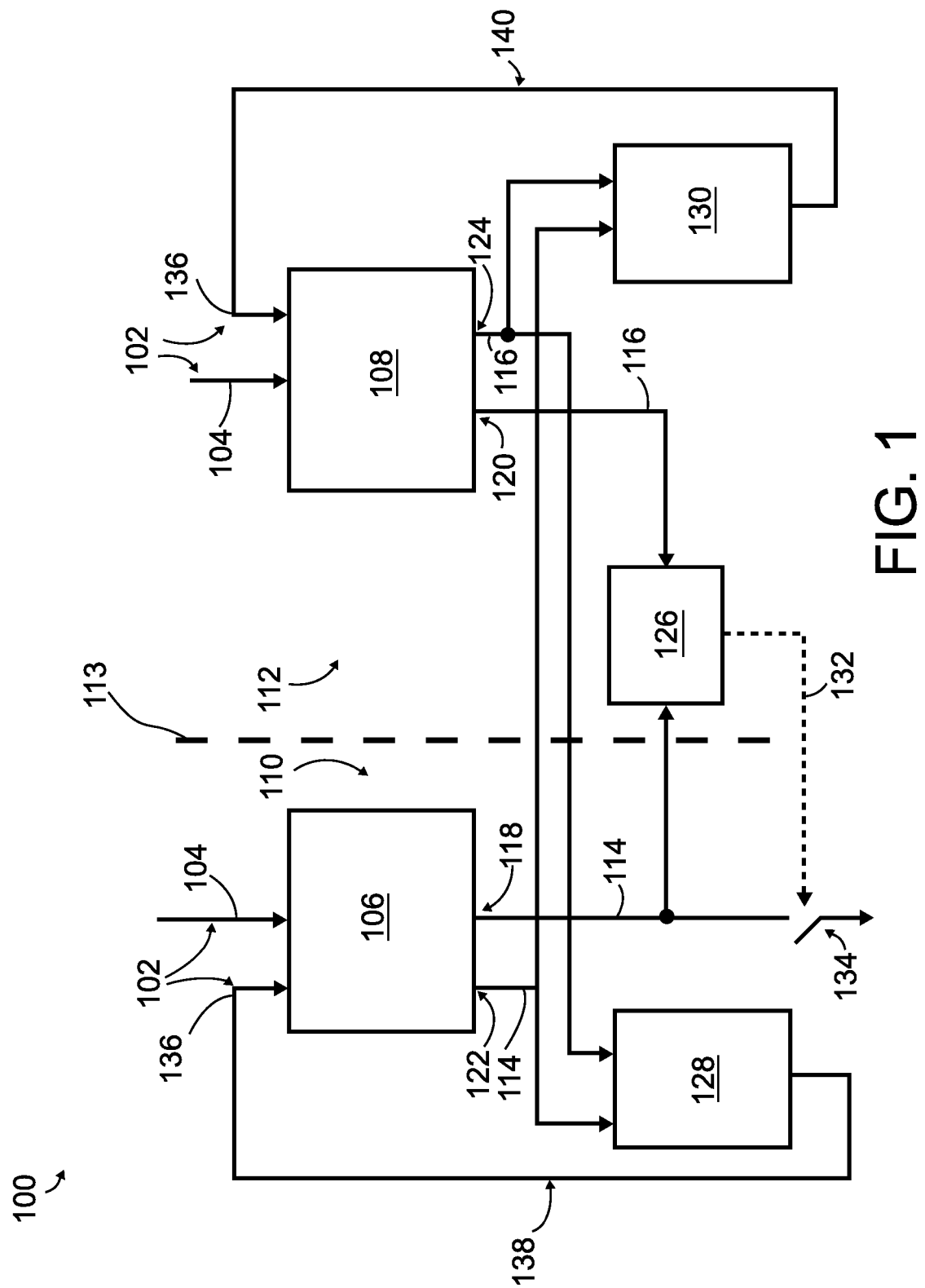
FIG. 1 illustrates a block diagram of a computing device in a fly-by-wire system, according to some embodiments of the inventive concepts disclosed herein.

It is to be understood that the following disclosure describes several exemplary embodiments for implementing different features, structures, or functions of the inventive concepts disclosed herein. Exemplary embodiments of components, arrangements, and configurations are described below to simplify the present disclosure; however, these exemplary embodiments are provided merely as examples and are not intended to limit the scope of the inventive concepts disclosed herein. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the inventive concepts disclosed herein.

Additionally, certain terms are used throughout the following description and claims to refer to particular components. As one skilled in the art will appreciate, various entities may refer to the same component by different names, and as such, the naming convention for the elements described herein is not intended to limit the scope of the inventive concepts disclosed herein, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the inventive concepts disclosed herein may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Example embodiments disclosed herein may be directed to systems and methods for maintaining system integrity in flight control systems having multi-lane computational differences. In flight control systems, and in particular, fly-by-wire systems, system integrity (e.g., the system is configured to be relatively fail-safe by minimizing incorrect outputs and thereby being fail-operative) and system availability (e.g., if one device fails the aircraft can still be controlled) are of relatively high importance. Therefore, according to embodiments disclosed herein, the flight control systems may use multiple lanes of computation having at least one dissimilar processor in each lane of computation. In some embodiments, one or more lanes of computation may have a single processor while the remaining lane(s) of computation may have multiple dissimilar processors. In other embodiments, each lane of computation may have multiple dissimilar processors.

According to example embodiments, the dissimilar processors may be commercial-off-the-shelf (COTS) processors. The COTS processors may be dissimilar in various ways including, but not limited to, the COTS processors running at different clock speeds, or having different processor architectures. It should also be noted that, although the COTS processors may be dissimilar with regards to physical characteristics (e.g., hardware) including, but not limited to, design, construction, and operation, example embodiments disclosed below are fully applicable to systems wherein processor dissimilarity may be non-physical in nature (e.g., software). For example, dissimilarity may be due to a difference in the manner in which the COTS processors manipulate (e.g., encode and/or encrypt) data, or due to diversity in the algorithms performed by each. Also, processor dissimilarity may be incidentally introduced in a system at a later stage as a result of, for example, processor design update. It should also be noted that, although the COTS processors are dissimilar as noted above, the COTS processors may be designed to follow conventional mathematical standards of operation, such as, for example, IEEE floating point specification and may thus be considered to operate similar to each other.

For ease of explanation, example embodiments discussed below are directed to systems having two lanes of computation. However, it will be understood that example embodiments discussed below are fully applicable to systems having more than two lanes of computation. Also, example embodiments discussed below are directed to systems having dissimilar processors in each lane of computation; however, it will be understood that systems having similar processors in each lane of computation (or similar processors in one lane and dissimilar processors in another lane) are also within the scope of this disclosure. Further, although example embodiments below are discussed with respect to a fly-by-wire system, it should be noted that the example embodiments are fully applicable to other avionics systems, such as pilot display systems or any other system requiring high integrity.

FIG. 1 illustrates a block diagram of a computing device 100 in a fly-by-wire system, according to example embodiments. The computing device 100 may be a part of the fly-by-wire system that may include multiple computing devices 100, commonly referred to as channels, or the computing device 100 may be the fly-by-wire system itself. The computing device 100 may receive input data 102 including event data 104 corresponding to signals generated by one or more sensors (not shown) which may include conventional attitude, rate, and acceleration sensors as well as other devices such as control wheel force sensors that are conventionally utilized in modern transport. The one or more sensors may also include such devices as directional and vertical gyroscopes, rate gyroscopes, and accelerometers. The one or more sensors may additionally include conventional radial guidance equipment, such as very high frequency omnidirectional radio range (VOR), distance measuring equipment (DME), and instrument landing system (ILS) receivers, as well as radial altimeters. The one or more sensors may also include an air data computer for providing such parameters as barometric altitude, total air temperature, and air speed. A flight management system may also be included in the one or more sensors as well as aircraft control surface position and rate transducers, such as linear variable differential transformers, synchros, and tachometers as well as engine sensors. In an exemplary embodiment, the one or more sensors may include the full complement of analog and digital sensors needed to provide signals for use in controlling the aircraft. It will be appreciated that included within the one or more sensors are conventional, analog and digital signal processing circuits for preparing the event data 104 for entry into the computing device 100. Such processing circuits may include demodulators.

As illustrated in FIG. 1, event data 104 from the one or more sensors disclosed above may be provided as a component of the input data 102 received by the computing device 100. The event data 104 may be converted via one or more conversion devices (not shown) based on the format of the signals generated by the one or more sensors. Such formats may include discrete voltage levels, variable voltage levels, amplitude modulated AC carriers, serial digital information in various formats and various data rates and fiber optics information. The conversion devices may provide serial to parallel conversion, or demodulation of the sensor signals. Analog sensor signals may be serial or parallel digital data from, for example, an air data computer requiring serial-to-parallel conversion and/or level shifting.

The event data 104 may be provided asynchronously via a digital data bus (not shown) to two processors 106, 108, illustrated in FIG. 1 as a first processor 106 and a second processor 108. The processors 106, 108 may be COTS processors and may be dissimilar to one another. The processors 106,108 may be single core or multi-core processors. The processors 106,108 may be coupled to respective individual cards or the processors 106,108 may be coupled to a single card. The cards may facilitate relatively easy removal and replacement of the processors 106,108.

As illustrated in FIG. 1, the first processor 106 and the second processor 108 may be disposed in respective redundant computation lanes (illustrated as 110, 112 divided by fault-independence line 113). As arranged, the redundant computation lanes 110, 112 include a first computation lane 110, or command computation lane, and a second computation lane 112, or monitor computation lane. Accordingly, the first computation lane 110 and the second computation lane 112 may be considered to provide fault-independence (indicated by dashed-line 113). Outputs from the first computation lane 110 may be transmitted to aircraft control servos and/or flight director equipment (not shown) via the digital data bus for providing conventional control of the aircraft. Outputs may also be transmitted to conventional flight director instrumentation which provides visual commands to the pilot via attitude directed instruments. In some embodiments, prior to the outputs being transmitted to the aircraft control servos, flight director equipment, and/or the flight director instrumentation, the outputs from the first computation lane 110 may be converted into signals suitable for providing the variety of control and display functions utilized in the flight control system. The equipment to convert the outputs may include, for example, digital-to-analog converters. The converted signals may be, for example, discrete voltage levels, single digits, light transmission for fiber optics, serial digital transmissions, and voltages for servo valves to control hydraulic actuators for the aerodynamic control surfaces of the aircraft.

The first processor 106 and the second processor 108 are each programmed according to system operating modes (e.g., normal, secondary, and direct modes) and identical or substantially identical (e.g., allowing for minor algorithmic differences for dissimilarity) aircraft flight control laws to output respective computation data 114, 116 based on at least the input data 102 including the event data 104 received by the first processor 106 and the second processor 108. The first processor 106 and the second processor 108 may transmit the respective computation data 114, 116 via one or more outputs (four shown, 118, 120, 122, 124) to one or more programmable logic devices (three shown, 126, 128, 130) configured to receive the respective computation data 114, 116 from the first processor 106 and the second processor 108. Each of the programmable logic devices 126, 128, 130 may be programmed to include one or more algorithms for monitoring and/or correcting the computation data 114, 116 received from the first processor 106 and the second processor 108.

The respective computation data 114, 116, illustrated in FIG. 1 as first computation data 114 and second computation data 116, may be transmitted from the first processor 106 and second processor 108, respectively, and cross-compared using the programmable logic device 126 to ensure that the same or substantially similar computation data is output in the respective computation lanes 110, 112. As provided for herein, substantially similar computation data refers to first and second computation data in which the determined difference is less than a first predetermined threshold value, as disclosed below. As shown in FIG. 1, the first computation data 114 may be output from the first processor 106 via output 118 and the second computation data 116 may be output from the second processor 108 via output 120 and cross-compared utilizing the programmable logic device 126, which may be, for example, a comparator. In some embodiments, two dissimilar comparators may be utilized to provide redundancy in the case of failure of one of the comparators. In an exemplary embodiment, the programmable logic device 126 may be a field programmable gate array (FPGA).

The programmable logic device 126 may be programmed to compare and determine a difference in the computation data 114, 116 received from the respective computation lanes 110, 112. The programmable logic device 126 may be further programmed to compare the determined difference with a first predetermined threshold value. The first predetermined threshold value may be parameter dependent and may be determined based on permitted tolerances to provide for proper functioning of the flight control system. If the determined difference is greater than the first predetermined threshold value, the programmable logic device 126 may be programmed to transmit a command signal 132 to a switch 134 or other regulating device configured to allow or prohibit the output of the first computation lane 110, or command lane, to be in communication with further components of the flight control system (e.g., aircraft control servos, flight director equipment, and/or the flight director instrumentation). In some embodiments, the command signal 132 may be provided directly to the above-noted components of the flight control system, thereby indicating that the first predetermined threshold value has been exceeded and appropriate reconfiguration is to be initiated. In some embodiments, the transmission of the command signal may be delayed for a predetermined timing value, the predetermined timing value determined on a parameter dependent basis provided to ensure proper functioning of the flight control system if the first predetermined threshold value is not exceeded for a duration exceeding the predetermined timing value. Upon receipt of the command signal 132, the switch 134 may be actuated to an open position (shown in FIG. 1), thus prohibiting the output of the first computation lane 110 from communicating with the above-noted components of the flight control system. If the determined difference is less than the first predetermined threshold value, the communication with the above-noted components is uninterrupted and the programmable logic device 126 may be programmed to await the next computation data frame.

In addition to the foregoing, the first computation data 114 and the second computation data 116 may be transmitted via respective outputs 122, 124 of the first processor 106 and second processor 108 to at least one of the programmable logic devices 126, 128, 130. As provided herein, the first computation data 114 and second computation data 116 transmitted via respective outputs 122, 124 may be identical to the first computation data 114 and second computation data 116 transmitted via respective outputs 118, 120, or in other embodiments, the first computation data 114 and second computation data 116 transmitted via respective outputs 122, 124 may differ from the first computation data 114 and second computation data 116 transmitted via respective outputs 118, 120. For example, the first computation data 114 and second computation data 116 transmitted via respective outputs 122, 124 may be intermediate computation values such as integrator values or logic mode states utilized in providing the first computation data 114 and second computation data 116 transmitted via respective outputs 118, 120.

As illustrated in FIG. 1, the first computation data 114 and the second computation data 116 are each transmitted via respective outputs 122, 124 to programmable logic device 128 and programmable logic device 130. In another embodiment, the first computation data 114 and the second computation data 116 are each transmitted via respective outputs 122, 124 to programmable logic device 128, such that programmable logic device 130 may be omitted from the computing device 100. In another embodiment, the programmable logic devices 126, 128, 130 may be substituted with a single programmable logic device programmable to execute the algorithms in each of the individual programmable logic devices 126, 128, 130.

In an exemplary embodiment, the programmable logic devices 128, 130 may each be or include a field programmable gate array (FPGA). The programmable logic devices 128, 130 may be similar to one another, or the programmable logic devices 128, 130 may be dissimilar to one another to increase system integrity in instances in which completeness of the testing thereof may not be asserted. The programmable logic devices 128, 130 may each be programmed to include one or more algorithms directed to determining the difference between the first computation data 114 and the second computation data 116, comparing the difference between the first computation data 114 and the second computation data 116 to a second predetermined threshold value, and calculating corrective computation data 136 based on the comparison. The programmable logic devices 128, 130 may each be configured to transmit the corrective computation data 136 to the first processor 106 and the second processor 108, respectively, in a feedback configuration.

As illustrated in FIG. 1, the first computation data 114 from the first processor 106 may be transmitted to each of the programmable logic devices 128, 130 via output 122. Correspondingly, the second computation data 116 from the second processor 108 may be transmitted to the programmable logic devices 128, 130 via output 124. Each of the programmable logic devices 128, 130 may be programmed to include an algorithm operable to determine the difference between the first computation data 114 and the second computation data 116. The programmable logic devices 128, 130 may each be further programmed to include an algorithm operable to compare the determined difference between the first computation data 114 and the second computation data 116 to a second predetermined threshold value. The second predetermined threshold value may be parameter dependent and may be determined based on permitted tolerances to provide for proper functioning of the flight control system. The second predetermined threshold value may be considered a "null-zone" value, below which no correction is considered necessary for proper system functioning.

Each of the programmable logic devices 128, 130 may further be programmed to include an algorithm operable to calculate the corrective computation data 136 based on the amount the determined difference between the first computation data 114 and the second computation data 116 exceeds the second predetermined threshold value. In one or more embodiments, the corrective computation data 136 may be limited in magnitude by a third predetermined threshold value, which defines the maximum corrective computation data that is permitted to be employed. The third predetermined threshold value may be parameter dependent and may be determined based on acceptably small disturbance to the system, that is, if one of the first and second processors is faulted, its effect on the other (fault-independent) processor is acceptably small that system integrity is maintained. The algorithm may be configured to calculate the magnitude-limited corrective computation data 136 to decrease the calculated difference in subsequent computation frames to an amount below the second predetermined threshold value. To do so, the corrective computation data 136 is transmitted back to the respective processors 106, 108 in a feedback configuration via respective feedback lines 138, 140. As configured in the feedback arrangement, the corrective computation data 136 may be provided as a component of the input data 102 received by the respective processors 106, 108. The corrective computation data 136 may be processed in conjunction with the event data 104 (collectively, the input data 102) provided to the respective processors 106, 108, thereby adjusting the output provided in the previous computation frame via the first computation data 114 and the second computation data 116. In an exemplary embodiment, the corrective computation data 136 transmitted from each of the programmable logic devices 128, 130 may be the same. In other embodiments, the corrective computation data 136 transmitted from each of the programmable logic devices 128, 130 may be dissimilar.

In some embodiments, the first computation data 114 and the second computation data 116 may be non-continuous data, i.e., discrete data. Accordingly, the programmable logic devices 128, 130 may each be configured to determine the difference between the discrete data of the first computation data 114 and the second computation data 116. The difference as disclosed herein may be the readiness of each of the discrete data to perform a transition. For example, a state transition in the algorithms of each lane may be represented by a pair of related discrete signals, one indicating that conditions are such that a transition may be performed, i.e., is acceptable from an integrity standpoint, and the other indicating that conditions are such that a transition should be performed, i.e., all criteria has been met. The corrective computation data 136 in such cases may be the logic (e.g., and/or logic depending on conditions) provided to signal when the first computation lane 110 and the second computation lane 112 are in sufficient agreement to perform the transition.

Figure 2:
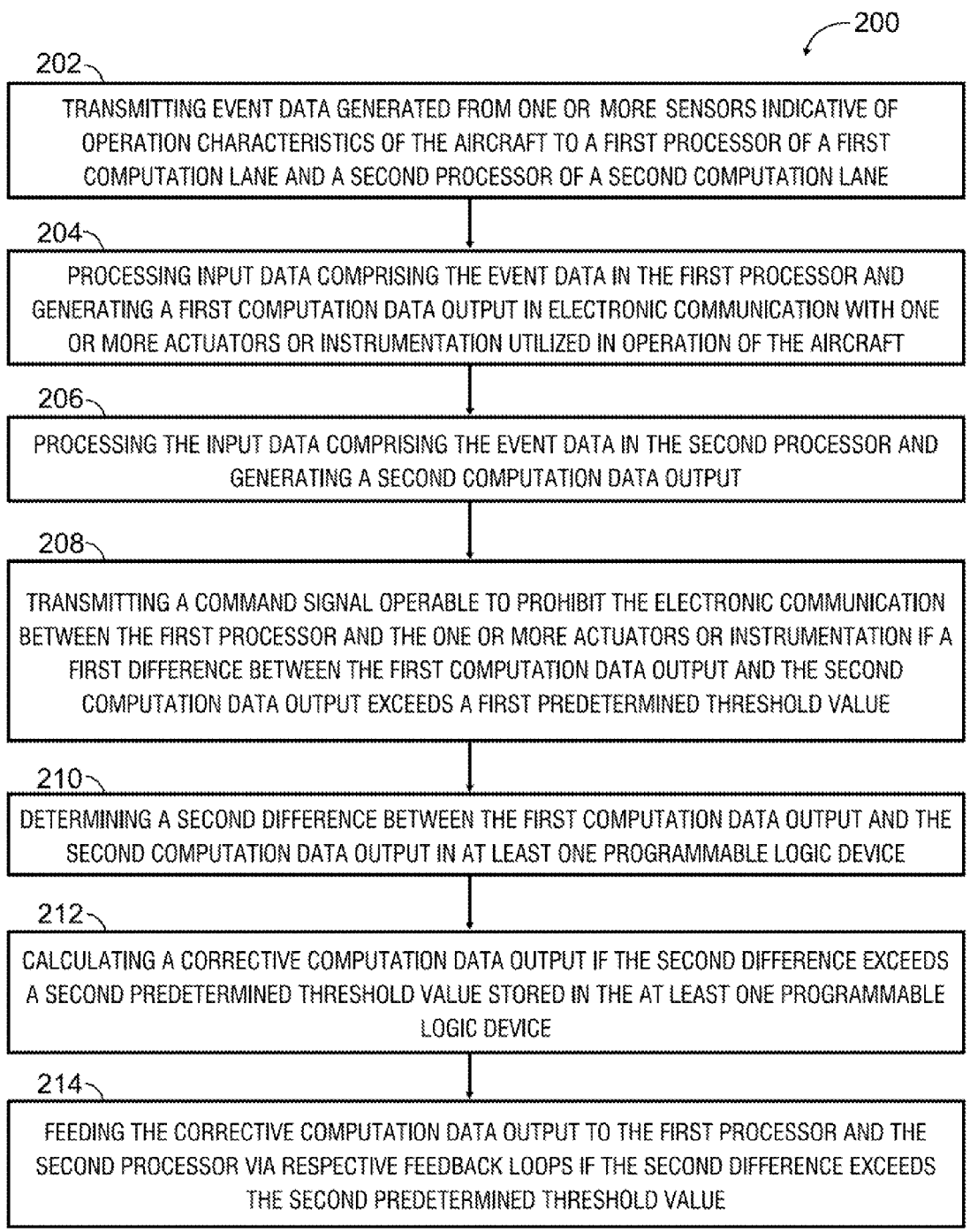
FIG. 2 illustrates a flowchart of a monitoring method for a control system of an aircraft, according to some embodiments of the inventive concepts disclosed herein.

FIG. 2 illustrates a flowchart of a monitoring method 200 for a flight control system of an aircraft. The monitoring method 200 may include transmitting event data generated from one or more sensors indicative of operation characteristics of the aircraft to a first processor of a first computation lane and a second processor of a second computation lane, as at 202. In some embodiments, the first processor is dissimilar in hardware and software to the second processor. The monitoring method 200 may also include processing input data including the event data in the first processor and generating a first computation data output in electronic communication with one or more actuators or instrumentation utilized in operation of the aircraft, as at 204. The monitoring method 200 may further include processing the input data including the event data in the second processor and generating a second computation data output, as at 206.

The monitoring method 200 may also include transmitting a command signal operable to prohibit the electronic communication between the first processor and the one or more actuators or instrumentation if a first difference between the first computation data output and the second computation data output exceeds a first predetermined threshold value, as at 208. The monitoring method 200 may further include determining a second difference between the first computation data output and the second computation data output in at least one programmable logic device, as at 210. The monitoring method 200 may also include calculating a corrective computation data output if the second difference exceeds a second predetermined threshold value stored in the at least one programmable logic device, as at 212, and feeding the corrective computation data output to the first processor and the second processor via respective feedback loops if the second difference exceeds the second predetermined threshold value, as at 214.

Example embodiments may also be directed to a computer-program product for maintaining system integrity in flight control systems having multi-lane computational differences. The computer-program product may include one or more instructions stored on a non-transitory computer-readable medium and executable by one or more processors of a computer on which the computer-program product is run. A computer-readable media may be any available media that may be accessed by a computer. By way of example, such computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, when the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The foregoing has outlined features of several embodiments so that those skilled in the art may better understand the inventive concepts disclosed herein. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the inventive concepts disclosed herein, and that they may make various changes, substitutions and alterations herein without departing from the broad scope of the inventive concepts disclosed herein.

We claim:

1. A control system for an aircraft, comprising:
a first lane configured to communicate with one or more sensors configured to generate event data utilized in controlling the aircraft, the first lane comprising:
   a first processor configured to receive input data comprising the event data from the one or more sensors and to generate a first computation data output in electronic communication with one or more actuators or instrumentation utilized in operation of the aircraft;
a second lane configured to communicate with the one or more sensors, the second lane comprising:
   a second processor configured to receive the input data comprising the event data from the one or more sensors and to generate a second computation data output;
a comparator in electronic communication with the first processor and the second processor, the comparator configured to receive the first computation data output and the second computation data output and to transmit a command signal operable to prohibit the electronic communication between the first processor and the one or more actuators or instrumentation if a first difference between the first computation data output and the second computation data output exceeds a first predetermined threshold value; and
at least one programmable logic device in electronic communication with the first processor and the second processor, the at least one programmable logic device configured to receive the first computation data output and the second computation data output, determine a second difference between the first computation data output and the second computation data output, and transmit a corrective computation data output to the first processor and the second processor via respective feedback loops if the difference between the first computation data output and the second computation data output exceeds a second predetermined threshold value, wherein the input data further comprises the corrective computation data output.

2. The control system of claim 1, wherein the at least one programmable logic device comprises:
a first programmable logic device configured to receive the first computation data output and the second computation data output, determine the second difference between the first computation data output and the second computation data output, and transmit the corrective computation data output to the first processor via a first feedback loop if the second difference between the first computation data output and the second computation data output exceeds the second predetermined threshold value; and
a second programmable logic device configured to receive the first computation data output and the second computation data output, determine the second difference between the first computation data output and the second computation data output, and transmit the corrective computation data output to the second processor via a second feedback loop if the second difference between the first computation data output and the second computation data output exceeds the second predetermined threshold value.

3. The control system of claim 2, wherein:
the corrective computation data output is limited in magnitude by a third predetermined threshold value; the input data further comprises the corrective computation data output;
the first processor is further configured to generate the first computation data output based on the event data received from the one or more sensors and the corrective computation data transmitted from the first programmable logic device; and
the second processor is further configured to generate the second computation data output based on the event data received from the one or more sensors and the corrective computation data transmitted from the second programmable logic device.

4. The control system of claim 2, wherein the first programmable logic device is dissimilar in hardware and software to the second programmable logic device.

5. The control system of claim 1, wherein the at least one programmable device is a field programmable gate array.

6. The control system of claim 1, wherein the first processor is dissimilar in hardware and software to the second processor.

7. The control system of claim 1, wherein the first lane further comprises a switch in electronic communication with the comparator and configured to prohibit electronic communication between the first processor and the one or more actuators or instrumentation upon receipt of the command signal.

8. The control system of claim 1, wherein:
the corrective computation data output is limited in magnitude by a third predetermined threshold value;
the first processor is further configured to generate the first computation data output based on the event data received from the one or more sensors and the corrective computation data transmitted from the at least one programmable logic device; and
the second processor is further configured to generate the second computation data output based on the event data received from the one or more sensors and the corrective computation data transmitted from the at least one programmable logic device.

9. The control system of claim 1, wherein the comparator is a field programmable gate array and the at least one programmable logic device is the field programmable gate array.

10. The control system of claim 1, wherein the first processor and the second processor are configured to receive the input data asynchronously.

11. A monitoring method for a control system of an aircraft, comprising:
transmitting event data generated from one or more sensors indicative of operation characteristics of the aircraft to a first processor of a first computation lane and a second processor of a second computation lane;
processing input data comprising the event data in the first processor and generating a first computation data output in electronic communication with one or more actuators or instrumentation utilized in operation of the aircraft;
processing the input data comprising the event data in the second processor and generating a second computation data output;
transmitting a command signal operable to prohibit the electronic communication between the first processor and the one or more actuators or instrumentation if a first difference between the first computation data output and the second computation data output exceeds a first predetermined threshold value;

determining a second difference between the first computation data output and the second computation data output in at least one programmable logic device;

calculating a corrective computation data output if the second difference exceeds a second predetermined threshold value stored in the at least one programmable logic device; and feeding the corrective computation data output to the first processor and the second processor via respective feedback loops if the second difference exceeds the second predetermined threshold value, wherein the input data further comprises the corrective computation data output.

12. The monitoring method of claim 11, further comprising:

determining the first difference between the first computation data output and the second computation data output via a comparator.

13. The monitoring method of claim 12, wherein:

the at least one programmable logic device comprises a first programmable logic device and a second programmable logic device;

feeding the corrective computation data output to the first processor and the second processor further comprises:

feeding the corrective computation data output to the first processor from the first programmable logic device via a first feedback loop, and feeding the corrective computation data output to the second processor from the second programmable logic device via a second feedback loop if the second difference exceeds the second predetermined threshold value; and calculating the corrective computation data output if the second difference exceeds a second predetermined threshold value stored in the at least one programmable logic device further comprises:

limiting a magnitude of the corrective computation data based on a third predetermined threshold value.

14. The monitoring method of claim 13, wherein the first programmable logic device is dissimilar in hardware and software to the second programmable logic device.

15. The monitoring method of claim 11, wherein the first processor is dissimilar in hardware and software to the second processor.

16. The monitoring method of claim 11, wherein transmitting event data generated from the one or more sensors indicative of the operation characteristics of the aircraft to the first processor of the first computation lane and the second processor of a second computation lane further comprises:

asynchronously transmitting the event data generated from the one or more sensors indicative of the operation characteristics of the aircraft to the first processor and the second processor.

17. An aircraft control system comprising a plurality of redundant channels, each channel comprising:

a command lane configured to electronically communicate with one or more sensors configured to generate event data for use in controlling the aircraft, and the command lane comprising:

a first processor configured to receive input data comprising the event data from the one or more sensors indicative of operation characteristics of the aircraft, the first processor further configured to generate a first computation data output in electronic communication with one or more actuators or instrumentation utilized in operation of the aircraft;

a monitor lane configured to electronically communicate with the one or more sensors, the monitor lane comprising:

a second processor configured to receive the input data comprising the event data from the one or more sensors, the second processor further configured to generate a second computation data output;

at least one programmable logic device in electronic communication with the first processor and the second processor, the at least one programmable logic device configured to receive the first computation data output and the second computation data output, determine a difference between the first computation data output and the second computation data output, compare the difference to a first predetermined threshold value, calculate a corrective computation data output if the difference exceeds the first predetermined threshold value, and output the corrective computation data output to the first processor and the second processor via respective feedback loops, wherein the corrective computation data output is limited in magnitude by a second predetermined threshold value, and the input data further comprises the corrective computation data output.

18. The aircraft control system of claim 17, wherein the first processor is dissimilar in hardware and software to the second processor.

19. The aircraft flight control system of claim 18, wherein the at least one programmable device comprises:

a first programmable logic device configured to receive the first computation data output and the second computation data output, determine the difference between the first computation data output and the second computation data output, and transmit the corrective computation data output to the first processor via a first feedback loop if the difference between the first computation data output and the second computation data output exceeds the first predetermined threshold value;

a second programmable logic device dissimilar in hardware and software to the first programmable logic device and configured to receive the first computation data output and the second computation data output, determine the difference between the first computation data output and the second computation data output, and transmit the corrective computation data output to the second processor via a second feedback loop if the difference between the first computation data output and the second computation data output exceeds the first predetermined threshold value; and a comparator configured to output a command signal operable to prohibit the electronic communication between the first processor and the one or more actuators or instrumentation if the difference between the first computation data output and the second computation data output exceeds a third predetermined threshold value.

* * * * *